(12) United States Patent
Potter

(10) Patent No.: US 12,187,241 B2
(45) Date of Patent: Jan. 7, 2025

(54) WIPER HEATING DEVICE

(71) Applicant: Danny Potter, Les Coteaux (CA)

(72) Inventor: Danny Potter, Les Coteaux (CA)

( * ) Notice: Subject to any disclaimer, the term of this patent is extended or adjusted under 35 U.S.C. 154(b) by 162 days.

(21) Appl. No.: 17/881,691

(22) Filed: Aug. 5, 2022

(65) Prior Publication Data

US 2024/0042967 A1 Feb. 8, 2024

(51) Int. Cl.
| | | |
|---|---|---|
| *B60S 1/38* | (2006.01) | |
| *B60R 16/033* | (2006.01) | |
| *H01M 10/46* | (2006.01) | |
| *H01M 50/249* | (2021.01) | |
| *H01M 50/298* | (2021.01) | |
| *H02J 7/35* | (2006.01) | |
| *H05B 1/02* | (2006.01) | |
| *H05B 3/18* | (2006.01) | |
| *H05B 3/84* | (2006.01) | |

(52) U.S. Cl.
CPC ......... *B60S 1/3805* (2013.01); *H01M 10/465* (2013.01); *H01M 50/249* (2021.01); *H01M 50/298* (2021.01); *H05B 1/0236* (2013.01); *H05B 3/84* (2013.01); *B60R 16/033* (2013.01); *H02J 7/35* (2013.01); *H05B 3/18* (2013.01); *H05B 2203/016* (2013.01)

(58) Field of Classification Search
CPC ....... B60S 1/3805; H05B 1/0236; H05B 3/84; H05B 2203/014
USPC .................. 15/250.05–250, 9; 219/202, 203
See application file for complete search history.

(56) References Cited

U.S. PATENT DOCUMENTS

| | | | |
|---|---|---|---|
| 3,936,901 A | 2/1976 | Theckston | |
| 4,928,345 A * | 5/1990 | Meltzer ................. | B60S 1/4041 219/203 |
| 5,325,561 A * | 7/1994 | Kotlar ................... | B60S 1/3805 219/202 |
| 5,572,765 A | 11/1996 | Guell | |
| 5,603,856 A | 2/1997 | Bischoff | |
| 5,632,058 A * | 5/1997 | Stanak ................... | B60S 1/3805 15/250.4 |
| 5,841,106 A | 11/1998 | Kohler | |
| 6,028,291 A * | 2/2000 | Heisler ................ | H05B 1/0236 15/250.07 |
| 10,150,450 B2 | 12/2018 | Whiteford | |

FOREIGN PATENT DOCUMENTS

| | | |
|---|---|---|
| CA | 2182933 | 5/2001 |
| FR | 2585649 A3 * | 2/1987 |

OTHER PUBLICATIONS

Machine translation of description portion of French publication 2585649, published Feb. 1987. (Year: 1987).*

\* cited by examiner

*Primary Examiner* — Gary K. Graham

(57) ABSTRACT

A wiper heating device for selectively heating a wiper blade and wiper blade holder to melt snow and ice that has built up on each includes a wiper assembly comprising a wiper blade, a blade holder, and an arm. A blade heating element is embedded within and extends throughout the wiper blade, the blade heating element selectively heating the wiper blade. A holder heating element is embedded within and extends throughout the blade holder, the holder heating element selectively heating the blade holder. Each of the blade heating element and the holder heating element are electrically powered by a battery.

18 Claims, 7 Drawing Sheets

WIPER HEATING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to wiper heating devices and more particularly pertains to a new wiper heating device for selectively heating a wiper blade and wiper blade holder to melt snow and ice that has built up on each.

(2) Description of Related Art Including Information Disclosed Under 37 CFR 1.97 and 1.98

The prior art relates to wiper heating devices which contain a resistive wire or coil for electrically heating wiper blades to melt accumulated ice and snow. The devices disclosed by the prior art comprise external heating elements in some cases and embedded heating elements in others. The devices which include embedded heating elements have a heating element which is embedded either in a wiper blade or a wiper blade holder, but not both. They also do not provide functionality for different heating modes which heat different areas of the wiper blade. However, the prior art does not disclose a device which heats both the wiper blade and the wiper blade holder independently, nor does it disclose such a device that allows for heating of the wiper blade or heating of both the wiper blade and the wiper blade holder. Finally, the prior art also does not disclose an electrical system for powering the wiper blade heater which uses a solar panel to electrically charge a battery.

BRIEF SUMMARY OF THE INVENTION

An embodiment of the disclosure meets the needs presented above by generally comprising a wiper assembly comprising a wiper blade, a blade holder, and an arm. A blade heating element is embedded within and extends throughout the wiper blade, the blade heating element selectively heating the wiper blade. A holder heating element is embedded within and extends throughout the blade holder, the holder heating element selectively heating the blade holder. Each of the blade heating element and the holder heating element are electrically powered by a battery.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
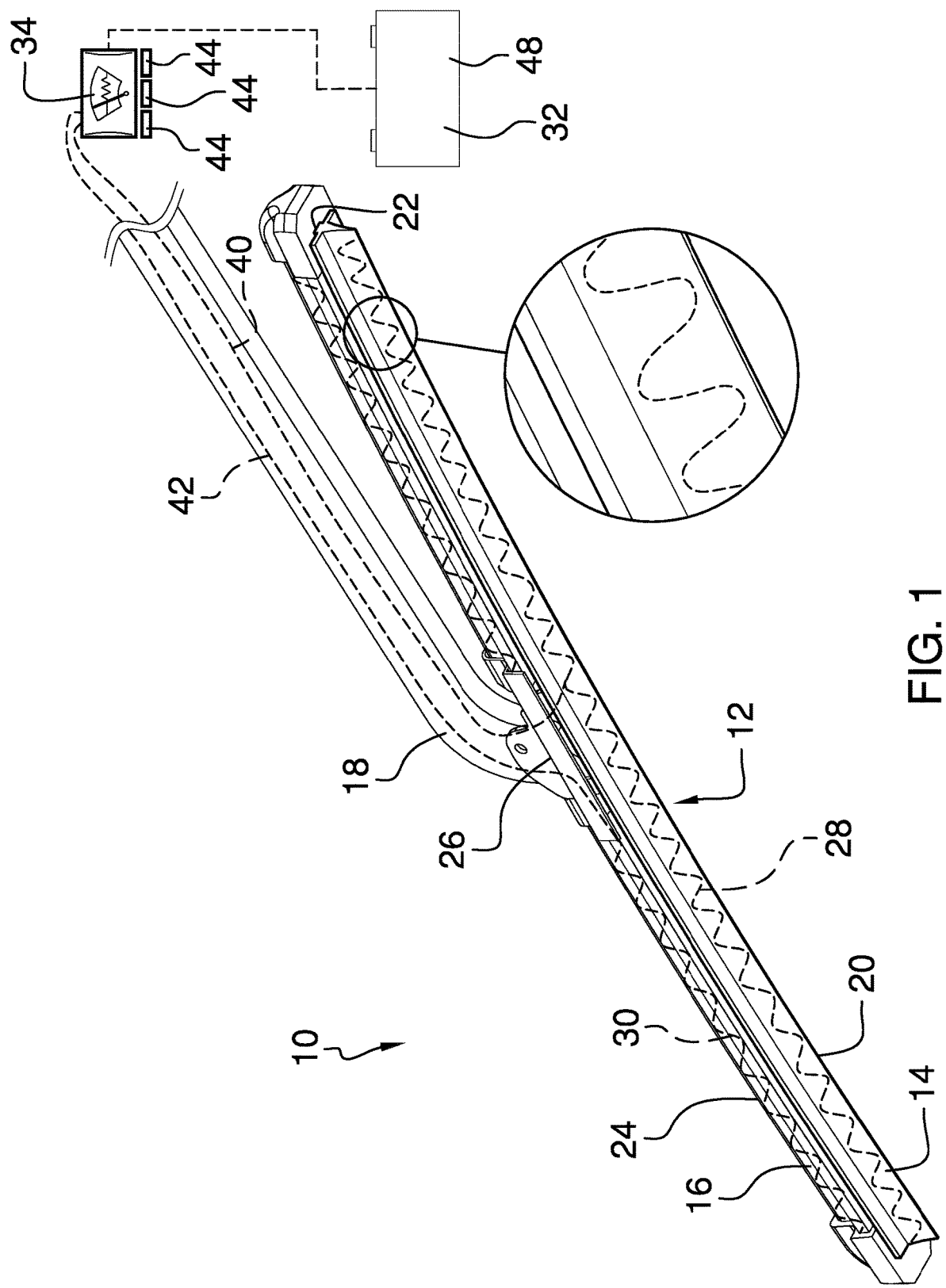
FIG. 1 is a bottom front side perspective view of a wiper heating device according to an embodiment of the disclosure.
Figure 2:
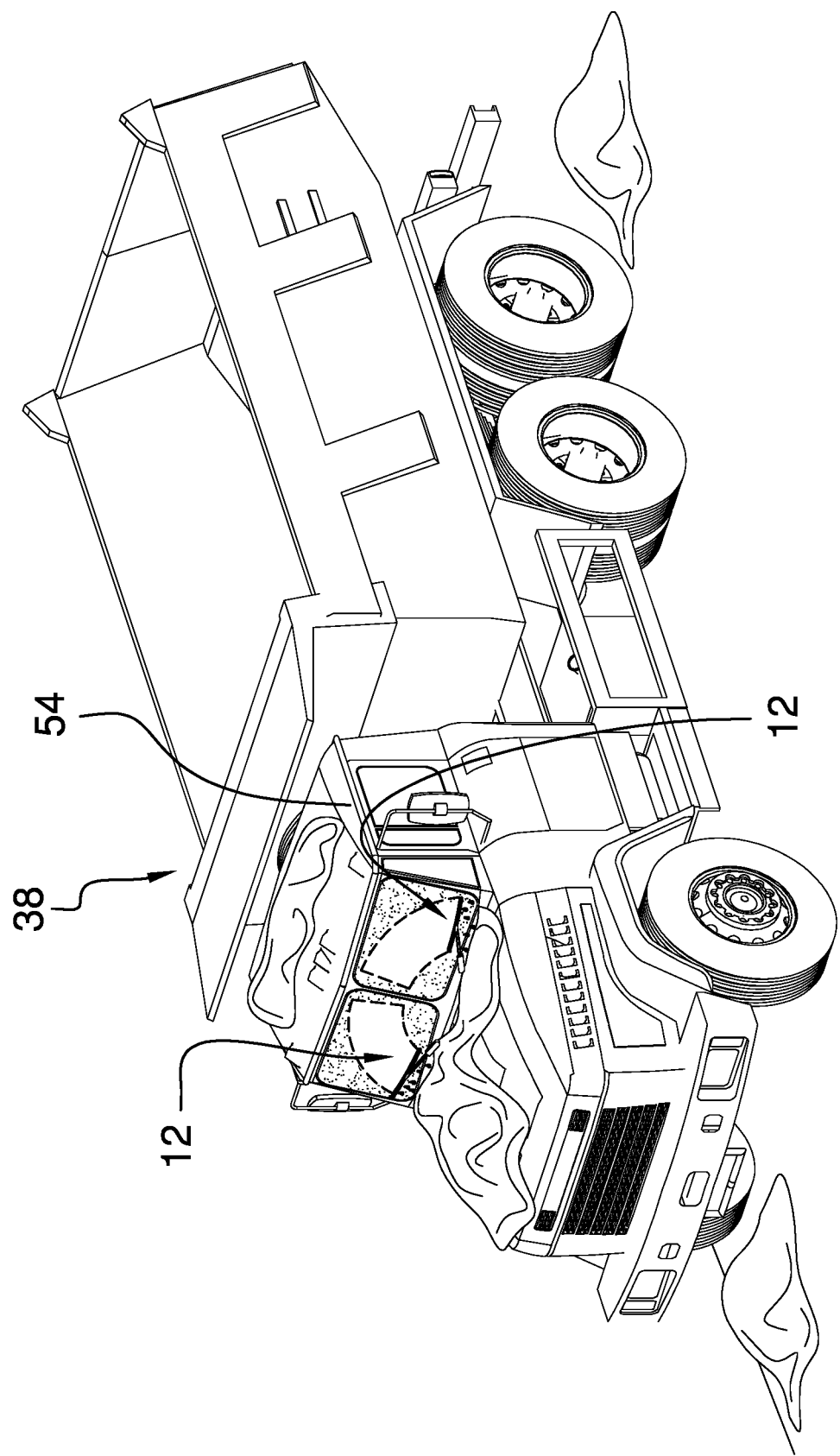
FIG. 2 is an in-use view of an embodiment of the disclosure.
Figure 3:
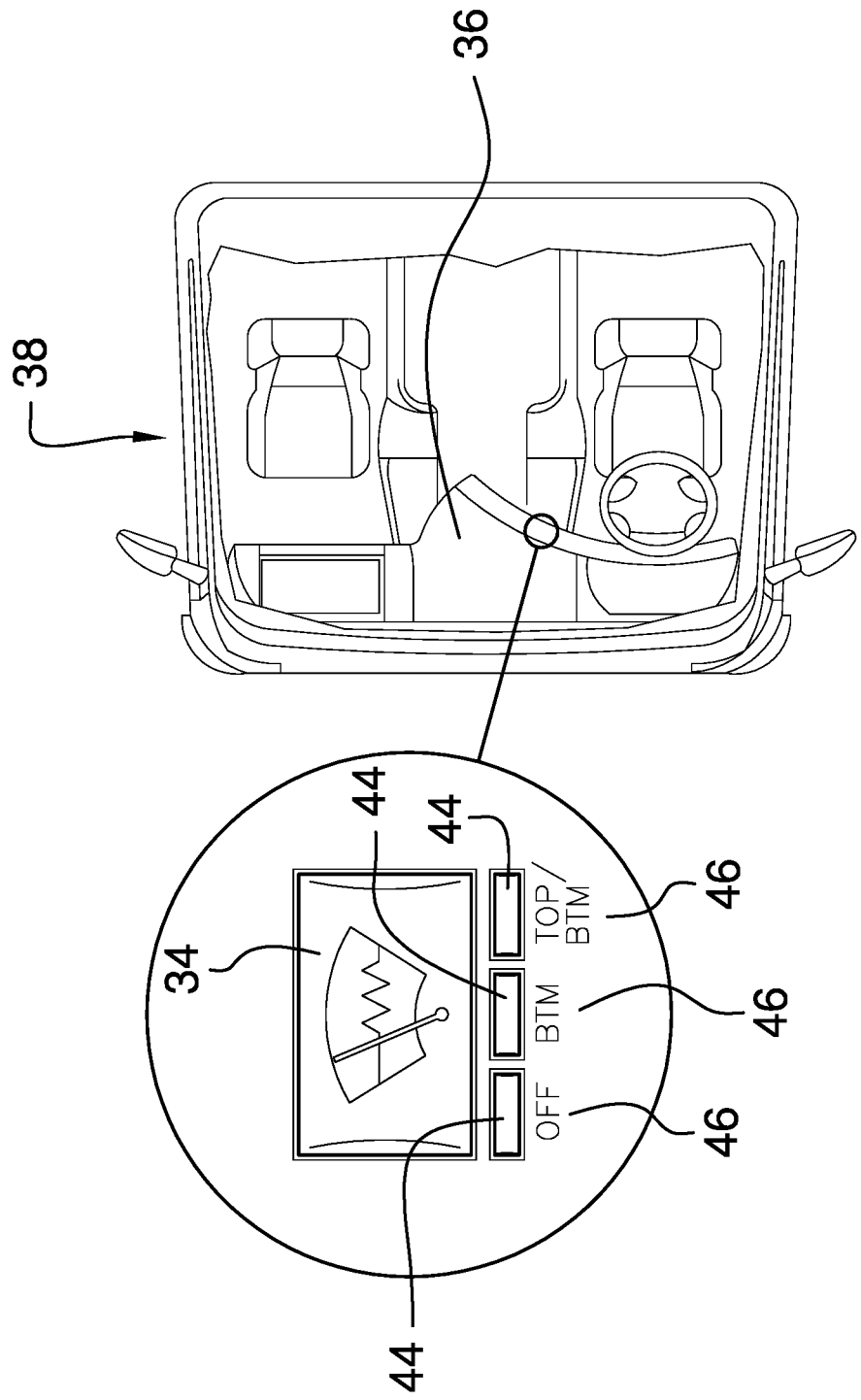
FIG. 3 is a front detail view of a control switch of an embodiment of the disclosure.
Figure 4:
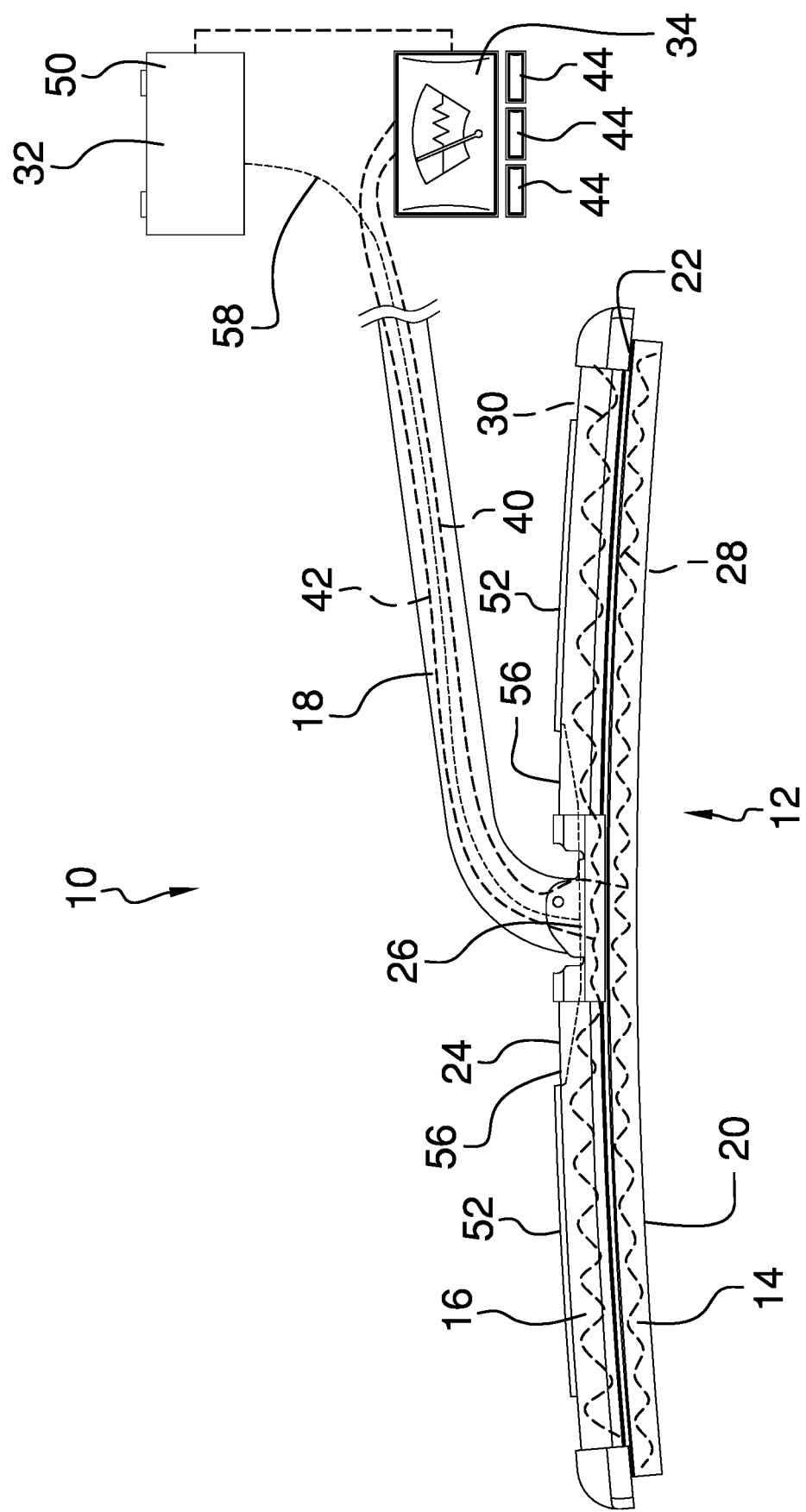
FIG. 4 is a front view of an alternative embodiment of the disclosure.
Figure 5:
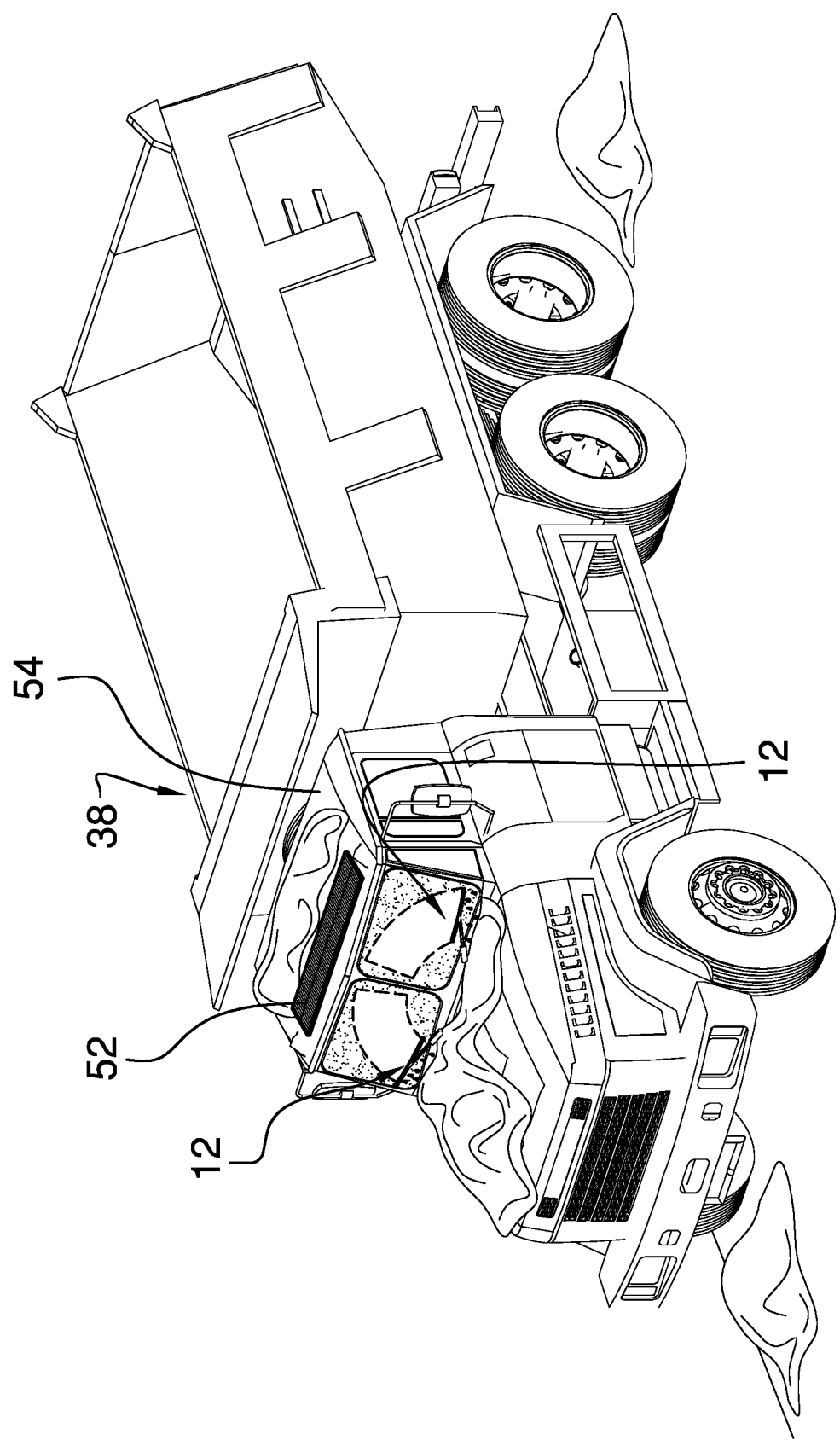
FIG. 5 is an in-use view of an alternative embodiment of the disclosure.
Figure 6:
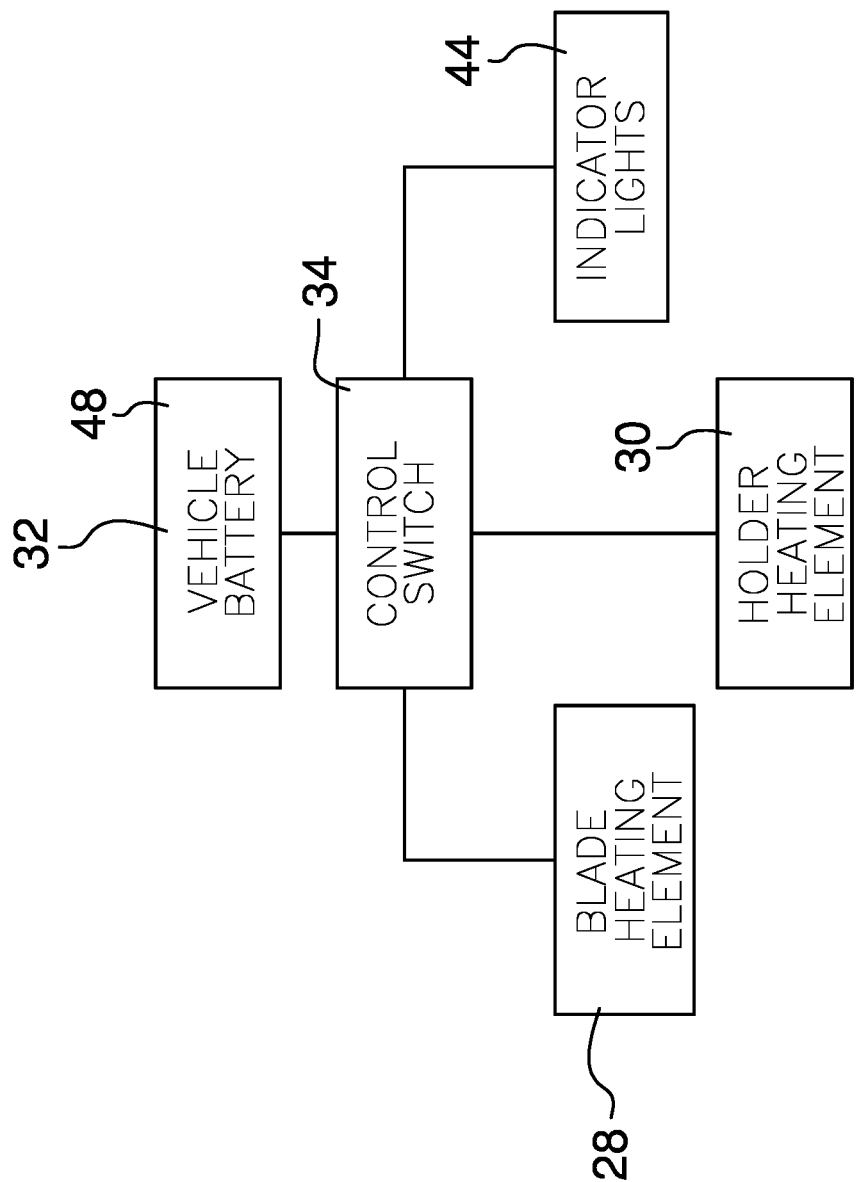
FIG. 6 is a block diagram view of an embodiment of the disclosure.
Figure 7:
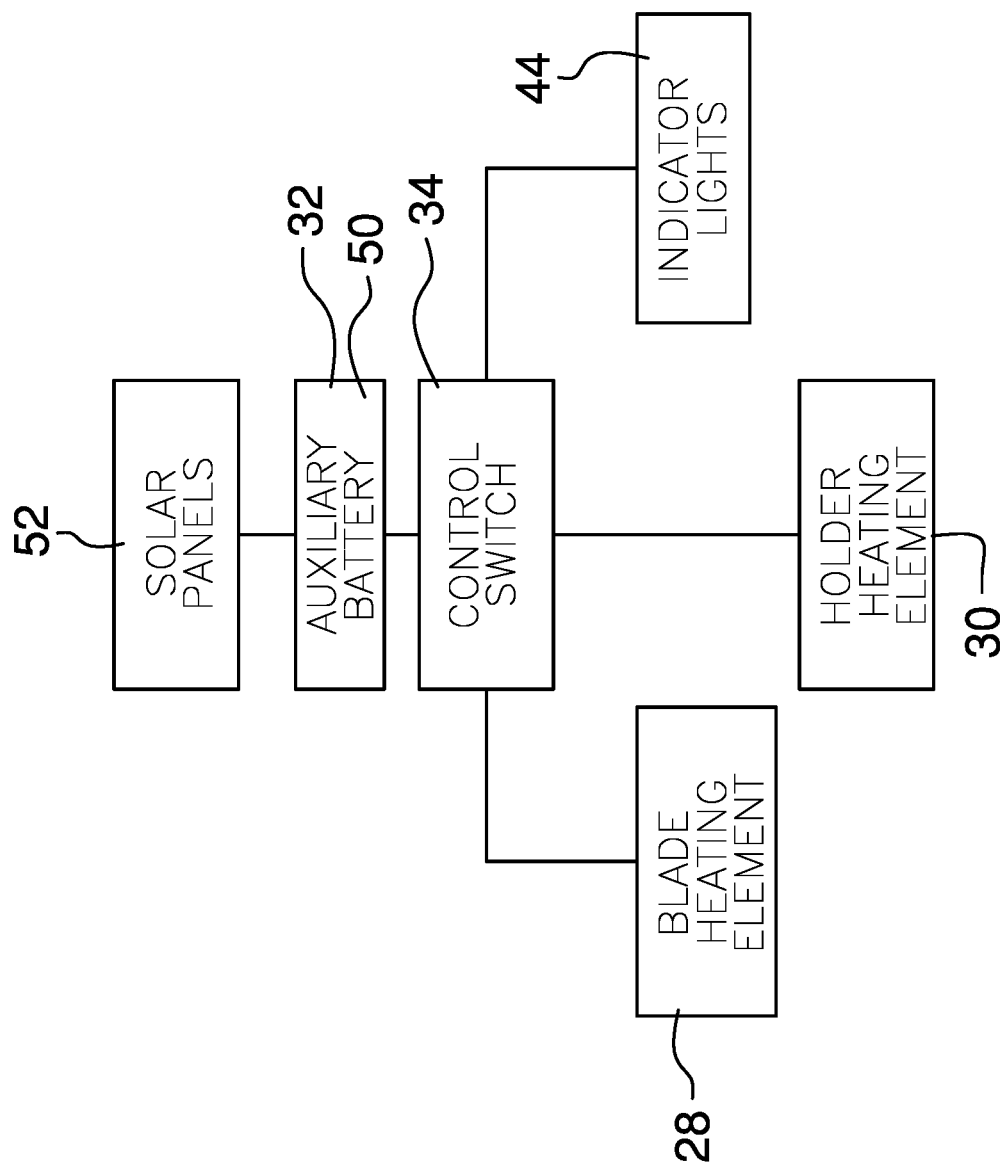
FIG. 7 is a block diagram view of an alternative embodiment of the disclosure.

With reference now to the drawings, and in particular to FIGS. 1 through 7 thereof, a new wiper heating device embodying the principles and concepts of an embodiment of the disclosure and generally designated by the reference numeral 10 will be described.

As best illustrated in FIGS. 1 through 7, the wiper heating device 10 generally comprises a pair of wiper assemblies 12, wherein each wiper assembly 12 comprising a wiper blade 14, a blade holder 16, and an arm 18. The wiper blade 14 is constructed of a flexible and resilient material. The wiper blade 14 has a wiper edge 20 and a holder side 22 opposite the wiper edge 20. The blade holder 16 is coupled to and extends along the holder side 22 of the wiper blade 14 and has an arm side 24 facing away from the wiper blade 14. The arm 18 is coupled to the arm side 24 of the blade holder 16 at a midpoint 26 of the arm side 24 of the blade holder 16.

Each of a pair of blade heating elements 28 is embedded within the wiper blade 14 of an associated wiper assembly 12 of the pair of wiper assemblies 12. Each blade heating element 28 extends throughout the wiper blade 14 of the associated wiper assembly 12 and is configured for heating the wiper blade 14 of the associated wiper assembly 12.

Each of a pair of holder heating elements 30 is embedded within the blade holder 16 of an associated wiper assembly 12 of the pair of wiper assemblies 12, extends throughout the blade holder 16 of the associated wiper assembly 12, and is configured for heating the blade holder 16 of the associated wiper assembly 12.

A battery 32 is selectively electrically coupled to each of the pair of blade heating elements 28 and the pair of holder heating elements 30. A control switch 34 selectively couples the battery 32 to each of the pair of blade heating elements 28 and the pair of holder heating elements 30. The control switch 34 is configured for being positioned on a dashboard 36 of a vehicle 38 and for being reachable by a driver of the vehicle 38 when the driver is driving the vehicle 38. The control switch 34 is configurable in a plurality of modes, the plurality of modes comprising an off mode, a blade heating mode, and a blade and holder heating mode. The off mode comprises the battery 32 being uncoupled from each of the pair of blade heating elements 28 and the pair of holder heating elements 30.

The blade heating mode comprises the battery 32 being coupled to the pair of blade heating elements 28 and uncoupled from the pair of holder heating elements 30. The blade and holder heating mode comprises the battery 32 being coupled to the pair of blade heating elements 28 and the pair of holder heating elements 30.

Each of a pair of blade electrical wires 40 electrically couples the control switch 34 to an associated blade heating element 28 of the pair of blade heating elements 28. Each blade electrical wire 40 extends through the arm 18 of an associated wiper assembly 12 of the pair of wiper assemblies 12 and the blade holder 16 of the associated wiper assembly 12, into the wiper blade 14 of the associated wiper assembly 12 to the associated blade heating element 28. Each of a pair of holder electrical wires 42 electrically couples the control switch 34 to an associated holder heating element 30 of the pair of holder heating elements 30. Each holder electrical wire 42 extends through the arm 18 of an associated wiper assembly 12 of the pair of wiper assemblies 12 and into the blade holder 16 of the associated wiper assembly 12 to the associated holder heating element 30.

Each of a plurality of indicator lights 44 indicates when the control switch 34 is in an associated mode. Each of a plurality of indicia 46 is positioned proximate an associated indicator light 44 and indicates to which mode the associated indicator light 44 is associated.

In a first embodiment of the present invention, the battery 32 is a vehicle battery 48 which powers an electrical system of the vehicle 38. In a second embodiment, the battery 32 of the device 10 is an auxiliary battery 50 which does not power the electrical system of the vehicle 38. In the second embodiment, the device 10 further comprises a solar panel 52 that is electrically coupled to the auxiliary battery 50 and is configured for converting a quantity of sunlight into an electrical charge for charging the auxiliary battery 50.

In a first variation of the second embodiment, the solar panel 52 is positioned on a roof 54 of the vehicle 38 and is configured for is positioned above the driver when the driver is driving the vehicle 38. In a second variation of the second embodiment, the solar panel 52 is one of a plurality of solar panels 52. In the second variation, the arm side 24 of the blade holder 16 of each wiper assembly 12 comprises a pair of solar panel portions 56 positioned on opposite sides of the arm 18, and each solar panel 52 is positioned on and coupled to an associated solar panel portion 56. Each solar panel 52 is electrically coupled to the auxiliary battery 50 and is configured for converting a quantity of sunlight into an electrical charge for charging the auxiliary battery 50. Each of a plurality of charging wires 58 electrically couples an associated solar panel 52 of the plurality of solar panels 52 to the auxiliary battery 50. Each charging wire 58 extends from the associated solar panel 52, through the wiper holder of an associated wiper assembly 12 of the pair of wiper assemblies 12 and the arm 18 of the associated wiper assembly 12 to the auxiliary battery 50.

In use, the control switch 34 is operated to switch to the blade heating mode to heat the wiper blade 14 of each wiper assembly 12, thereby activating each blade heating element 28 and melting ice and snow that has built up onto the wiper blade 14 of each wiper assembly 12. If ice and snow has also built up on the blade holder 16, the control switch 34 is operated to switch to the blade and holder heating mode to activate each blade heating element 28 and holder heating element 30 and melt all the ice and snow that has accumulated thereon. If there is no ice or snow buildup, the control switch 34 is operated to switch to the off mode, deactivating each blade heating element 28 and each holder heating element 30.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A wiper heating device comprising:
a wiper assembly, said wiper assembly comprising a wiper blade, a blade holder, and an arm,
said wiper blade being constructed of a flexible and resilient material, said wiper blade having a wiper edge, said wiper blade having a holder side opposite said wiper edge,
said blade holder being coupled to and extending along said holder side of said wiper blade, said blade holder having an arm side facing away from said wiper blade,
said arm being coupled to said arm side of said blade holder;
a blade heating element, said blade heating element being embedded within said wiper blade, said blade heating element extending throughout said wiper blade of an associated wiper assembly, said blade heating element being configured for heating said wiper blade;
a holder heating element, said holder heating element being embedded within said blade holder, said holder heating element extending throughout said blade holder of said associated wiper assembly, each said holder heating element being configured for heating said blade holder;

a battery, said battery being electrically coupled to each of said blade heating element and said holder heating element;

a control switch, said control switch selectively coupling said battery to each of said blade heating element and said holder heating element, said control switch selectively electrically coupling said battery to each of said blade heating element and said holder heating element; and said control switch being configurable in a plurality of modes, said plurality of modes comprising:
- an off mode, said off mode comprising said battery being uncoupled from each of said pair of blade heating elements and said pair of holder heating elements;
- a blade heating mode, said blade heating mode comprising said battery being coupled to said pair of blade heating elements and uncoupled from said pair of holder heating elements; and
- a blade and holder heating mode, said blade and holder heating mode comprising said battery being coupled to said pair of blade heating elements and said pair of holder heating elements.

2. The device of claim 1, further comprising a plurality of indicator lights, each indicator light indicating when said control switch is in an associated mode.

3. The device of claim 2, further comprising a plurality of indicia, each indicium being positioned proximate an associated indicator light, each indicium indicating to which mode said associated indicator light is associated.

4. The device of claim 1, further comprising:
a blade electrical wire, said blade electrical wire being electrically coupled to said blade heating element and selectively electrically coupled to said battery, said blade electrical wire extending through said arm and said blade holder into said wiper blade to said blade heating element; and
a holder electrical wire, said holder electrical wire being electrically coupled to said holder heating element and selectively electrically coupled to said battery, said holder electrical wire extending through said arm and into said blade holder to said holder heating element.

5. The device of claim 1, further comprising:
a blade electrical wire, said blade electrical wire being electrically coupled to said blade heating element and said control switch, said blade electrical wire extending through said arm and said blade holder into said wiper blade to said blade heating element; and
a holder electrical wire, said holder electrical wire being electrically coupled to said holder heating element and said control switch, said holder electrical wire extending through said arm and into said blade holder to said holder heating element.

6. The device of claim 1, further comprising said battery being a vehicle battery.

7. The device of claim 1, further comprising a solar panel, said solar panel being electrically coupled to said battery, said battery being an auxiliary battery, said solar panel being configured for converting a quantity of sunlight into an electrical charge for charging said auxiliary battery.

8. The device of claim 7, further comprising said solar panel being positioned on a roof of the vehicle.

9. The device of claim 7, further comprising said solar panel being positioned on and coupled to said blade holder.

10. The device of claim 9, further comprising a charging wire, said charging wire being electrically coupled to said solar panel and selectively electrically coupled to said auxiliary battery, said charging wire extending from said solar panel, through said wiper holder, and through said arm.

11. The device of claim 7, further comprising said blade holder comprising a pair of solar panel portions positioned on opposite sides of said arm, said solar panel being one of a pair of solar panels, each said solar panel being electrically coupled to said auxiliary battery, each said solar panel being positioned on and coupled to an associated solar panel portion.

12. The device of claim 11, further comprising a pair of charging wires, each said charging wire being electrically coupled to an associated solar panel of said pair of solar panels and selectively electrically coupled to said auxiliary battery, each said charging wire extending from said associated solar panel, through said wiper holder, and through said arm.

13. The device of claim 1, further comprising:
said wiper assembly being one of a pair of wiper assemblies;
said blade heating element being one of a pair of blade heating elements, each said blade heating element being embedded within said wiper blade of an associated wiper assembly of said pair of wiper assemblies, each said blade heating element extending throughout said wiper blade of said associated wiper assembly, each said blade heating element being configured for heating said wiper blade of said associated wiper assembly; and
said holder heating element being one of a pair of holder heating elements, each said holder heating element being embedded within said blade holder of an associated wiper assembly of said pair of wiper assemblies, each said holder heating element extending throughout said blade holder of said associated wiper assembly, each said holder heating element being configured for heating said blade holder of said associated wiper assembly.

14. A wiper heating device comprising:
a pair of wiper assemblies, each said wiper assembly comprising a wiper blade, a blade holder, and an arm,
said wiper blade being constructed of a flexible and resilient material, said wiper blade having a wiper edge, said wiper blade having a holder side opposite said wiper edge,
said blade holder being coupled to and extending along said holder side of said wiper blade, said blade holder having an arm side facing away from said wiper blade,
said arm being coupled to said arm side of said blade holder, said arm being coupled to a midpoint of said arm side of said blade holder;
a pair of blade heating elements, each said blade heating element being embedded within said wiper blade of an associated wiper assembly of said pair of wiper assemblies, each said blade heating element extending throughout said wiper blade of said associated wiper assembly, each said blade heating element being configured for heating said wiper blade of said associated wiper assembly;
a pair of holder heating elements, each said holder heating element being embedded within said blade holder of an associated wiper assembly of said pair of wiper assemblies, each said holder heating element extending throughout said blade holder of said associated wiper assembly, each said holder heating element being configured for heating said blade holder of said associated wiper assembly;
a battery, said battery being selectively electrically coupled to each of said pair of blade heating elements and said pair of holder heating elements;
a control switch, said control switch selectively coupling said battery to each of said pair of blade heating elements and said pair of holder heating elements, said control switch being configured for being positioned on a dashboard of a vehicle, said control switch being configured for being reachable by a driver of the vehicle when the driver is driving the vehicle, said control switch being configurable in a plurality of modes, said plurality of modes comprising:
 an off mode, said off mode comprising said battery being uncoupled from each of said pair of blade heating elements and said pair of holder heating elements;
 a blade heating mode, said blade heating mode comprising said battery being coupled to said pair of blade heating elements and uncoupled from said pair of holder heating elements; and
 a blade and holder heating mode, said blade and holder heating mode comprising said battery being coupled to said pair of blade heating elements and said pair of holder heating elements;
a pair of blade electrical wires, each said blade electrical wire electrically coupling said control switch to an associated blade heating element of said pair of blade heating elements, each said blade electrical wire extending through said arm of an associated wiper assembly of said pair of wiper assemblies and said blade holder of said associated wiper assembly, into said wiper blade of said associated wiper assembly to said associated blade heating element;
a pair of holder electrical wires, each said holder electrical wire electrically coupling said control switch to an associated holder heating element of said pair of holder heating elements, each said holder electrical wire extending through said arm of an associated wiper assembly of said pair of wiper assemblies and into said blade holder of said associated wiper assembly to said associated holder heating element;
a plurality of indicator lights, each indicator light indicating when said control switch is in an associated mode; and
a plurality of indicia, each indicium being positioned proximate an associated indicator light, each indicium indicating to which mode said associated indicator light is associated.

15. The device of claim 14, further comprising said battery being a vehicle battery.

16. The device of claim 14, further comprising a solar panel, said solar panel being electrically coupled to said battery, said battery being an auxiliary battery, said solar panel being configured for converting a quantity of sunlight into an electrical charge for charging said auxiliary battery.

17. The device of claim 16, further comprising said solar panel being positioned on a roof of the vehicle, said solar panel being configured for being positioned above the driver when the driver is driving the vehicle.

18. The device of claim 16, further comprising:
 said solar panel being one of a plurality of solar panels, said arm side of said blade holder of each said wiper assembly comprising a pair of solar panel portions positioned on opposite sides of said arm, each said solar panel being positioned on and coupled to an associated solar panel portion, each said solar panel being electrically coupled to said auxiliary battery, each said solar panel being configured for converting a quantity of sunlight into an electrical charge for charging said auxiliary battery; and
 a plurality of charging wires, each said charging wire electrically coupling an associated solar panel of said plurality of solar panels to said auxiliary battery, each charging wire extending from said associated solar panel, through said wiper holder of an associated wiper assembly of said pair of wiper assemblies and said arm of said associated wiper assembly to said auxiliary battery.

\* \* \* \* \*